(12) United States Patent
Has et al.

(10) Patent No.: US 6,230,137 B1
(45) Date of Patent: May 8, 2001

(54) HOUSEHOLD APPLIANCE, IN PARTICULAR AN ELECTRICALLY OPERATED HOUSEHOLD APPLIANCE

(75) Inventors: Uwe Has, Unterneukirchen-Oberschroffen; Felicitas Ziegler, Stein, both of (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 09/455,602

(22) Filed: Dec. 6, 1999

Related U.S. Application Data

(63) Continuation of application No. PCT/EP98/03346, filed on Jun. 4, 1998.

(30) Foreign Application Priority Data

Jun. 6, 1997 (DE) .............................. 197 23 938
Aug. 27, 1997 (DE) .............................. 197 37 356

(51) Int. Cl.$^7$ .................................................. G10L 15/00
(52) U.S. Cl. ........................... 704/275; 704/271; 704/270
(58) Field of Search ................................. 704/270, 275, 704/271, 251, 246, 272

(56) References Cited

U.S. PATENT DOCUMENTS

| | | | | |
|---|---|---|---|---|
| 4,336,421 | * | 6/1982 | Welch et al. | 704/243 |
| 5,375,063 | * | 12/1994 | Peck et al. | 364/470.07 |
| 5,577,164 | * | 11/1996 | Kaneko et al. | 704/275 |
| 5,748,843 | * | 5/1998 | Peck et al. | 704/276 |
| 5,826,233 | * | 10/1998 | Matsumoto | 704/275 |

* cited by examiner

Primary Examiner—David Hudspeth
Assistant Examiner—Daniel Abebe
(74) Attorney, Agent, or Firm—Herbert L. Lerner; Laurence A. Greenberg; Werner H. Stemer

(57) ABSTRACT

A household appliance, in particular an electrically operated household appliance, can be controlled using voice signals. In order to avoid malfunction, e.g. as a result of voice signals coming from a radio set and not from a user, a control program is configured in such a way that successive voice signals can only form a control command when the successive voice signals are input within a given time period.

29 Claims, 3 Drawing Sheets

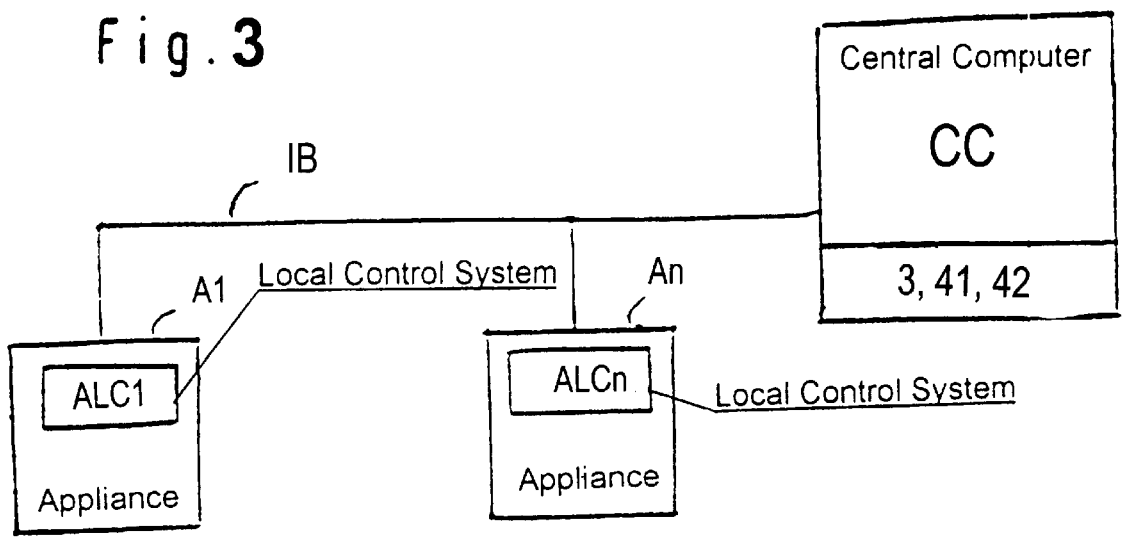
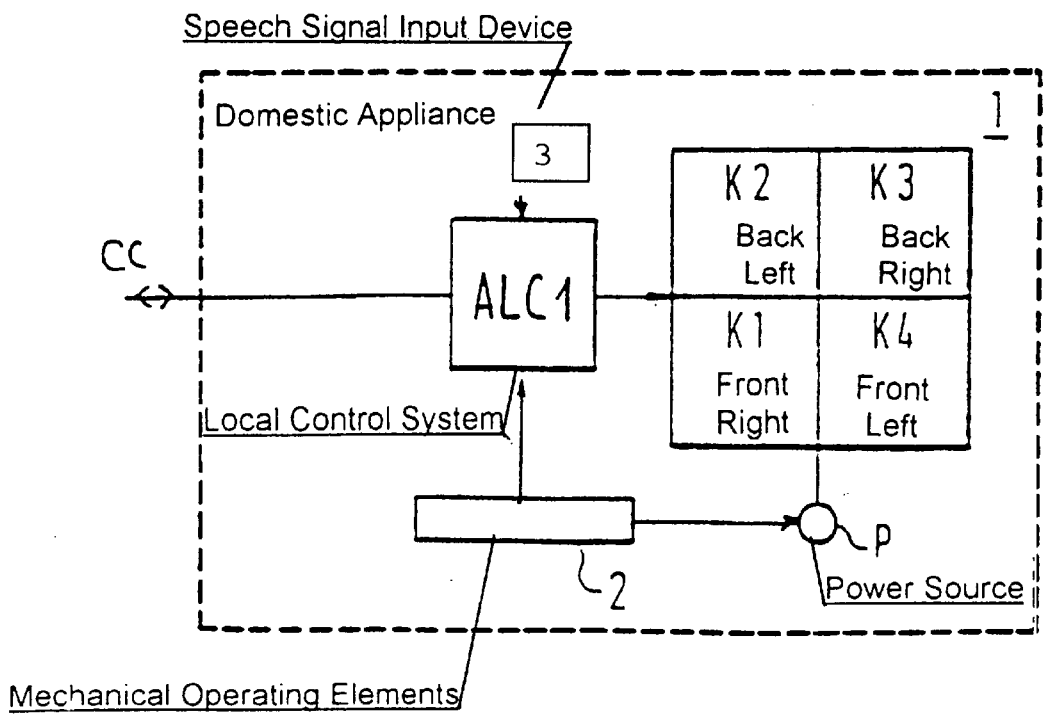

HOUSEHOLD APPLIANCE, IN PARTICULAR AN ELECTRICALLY OPERATED HOUSEHOLD APPLIANCE

CROSS-REFERENCE TO RELATED APPLICATION

This application is a continuation of copending International Application No. PCT/EP98/03346, filed Jun. 4, 1998, which designated the United States.

BACKGROUND OF THE INVENTION

FIELD OF THE INVENTION

The invention relates to a household appliance, in particular an electrically operated household appliance.

In household appliances, power is supplied to the electrical load or loads by mechanical actuators or control elements. The mechanical actuators or operating elements are located in the household appliance, so that the operator has to be at the location of the household appliance in order to actuate the operating elements. The operator therefore has to interrupt his current work and, if necessary, has to clean and to dry his hands. Furthermore, the actuation of household appliances often proves to be relatively troublesome for the disabled. A product for the rehabilitation sector is already known under the name "SICARE pilot" (available from the software vendor evosoft Softwarevertrieb GmbH, D-90411 Nuremberg/Germany), which includes a mobile device which converts spoken commands into signals. The signals are output by an infrared transmitter, for example for the control of television sets, video recorders, hi-fi systems, telephone and lighting, by radio transmitters, for example for the control of house doors, lifts, call and alarm systems, or by wire-bound interfaces, for example for the control of electrically driven wheelchairs and motor-adjustable beds. The known product, which is intended for physically disabled persons, permits the storage of a maximum of 64 commands. The mobile device transmits the command for the desired action, for example "television on" automatically to the appropriate device via the previously selected interface. Each individual instruction can address a number of devices at the same time. The known product is trained to the individual speech pattern of one person, and therefore implements speaker-dependent speech recognition. Ideally, other persons are not capable of generating signals which control the devices from spoken commands. In the known product, the speech recognition is implemented by predefined words (e.g. "house", "light", "four", "minus") which must be spoken in accordance with a menu tree having a number of branches, however it is possible for the individual words to be spoken at any desired time interval. If, because of an indisposition of the physically disabled person, the speech input is aborted prematurely, it is possible that individual words, which are, for example, generated by a radio or television set and which are provided in the branch of the menu tree, which is to be dealt with after the speech input was aborted, can cause signals to be generated which control one or more devices. Such an inadvertent control of one or more devices, for example a wheelchair, can endanger the physically disabled person.

The German patent document DE 38 03 220 discloses a household appliance having a program switching device. A phonetic control device is configured in such a way that code words or their speech pattern signals no longer called up or not called up for a long time are deleted from a speech pattern memory.

The European patent document EP 0 031 144 discloses a heating appliance having a device for recognizing speech and having a device for generating artificial speech signals. In this heating appliance, a first speech recognition step (m-1) is carried out, and is followed by a step (m-2), in which an artificial speech signal is produced, which is further followed by a second speech recognition step (m-3).

SUMMARY OF THE INVENTION

It is accordingly an object of the invention to provide a household appliance which overcomes the above-mentioned disadvantages of the heretofore-known appliances of this general type and which provides a simple, reliable, and rapid speech-controlled operation for the household appliance.

With the foregoing and other objects in view there is provided, in accordance with the invention, a household appliance configuration, including a household appliance, in particular an electrically operated household appliance, having operating functions and/or components, such as electrical load components; a first device, connected to the household appliance, for inputting at least two speech signals designating the operating functions and/or components of the household appliance; a second device, operatively connected to the first device, for recognizing the operating functions and/or components designated by the speech signals; and a third device, operatively connected to the second device, for converting the speech signals, after being recognized, into a given control command to operate the household appliance, the third device producing the given control command only when the speech signals are input in a sequence defined by a menu tree; and a controller having a control program and being assigned to at least one of the first, second, and third devices, the control program operating such that the speech signals, being input in a direct succession for selecting the operating functions and/or the components, cause a formation of the given control command only when the speech signals are separated in time by not more than a respective given first time period, the respective given first time period being a respective pause period, and are input within a respective given second time period.

In accordance with another feature of the invention, the controller is configured for carrying out a speaker-independent speech signal recognition or, alternatively, a speaker-dependent speech signal recognition.

In accordance with a further feature of the invention, the first device is disposed separated from the household appliance and may in particular be integrated into a portable telephone terminal.

In accordance with yet another feature of the invention, the first device has at least one microphone and is installed on a holding element, which damps structure-borne sound.

In accordance with another feature of the invention, the first device includes an electric filter damping oscillations of frequencies below approximately 100 hertz and/or above approximately 5 kilohertz.

In accordance with yet a further feature of the invention, the first, second, and third devices are a provided in place of mechanical operating elements for inputting control commands when actuated or in addition to the mechanical operating elements.

With the objects of the invention in view there is also provided, a household appliance system, including a household appliance having operating functions and/or components, such as electrical load components; a first device for inputting at least two speech signals designating the operating functions and/or the components of the household appliance; a second device, operatively connected to the first device, for recognizing the operating functions and/or the components designated by the speech signals; a third device, operatively connected to the second device, for converting the speech signals, after being recognized, into a given control command to operate the household appliance, the third device producing the given control command only when the speech signals are input in a sequence defined by a menu tree; and a central computer connected to the household appliance, at least one of the first, second, and third devices being assigned to the central computer, the first, second, and third devices being configured such that the speech signals, being input in a direct succession for selecting the operating functions and/or components of the household appliance, cause a formation of the given control command only when the speech signals are separated in time by not more than a respective given first time period and are input within a respective given second time period, the central computer being connectable to further household appliances.

With the objects of the invention in view there is further provided, in combination with a household appliance having components and operating functions, a speech-activated device including a first device for inputting at least two speech signals designating at least one of the components and operating functions of the household appliance; a second device, operatively connected to the first device, for recognizing the at least one of the components and operating functions designated by the speech signals; and a third device, operatively connected to the second device, for converting the speech signals, after being recognized, into a control command to operate the household appliance, the third device producing the control command only when the speech signals are input in a sequence defined by a menu tree; and a controller having a control program and being assigned to at least one of the first, second, and third devices, the control program operating such that the speech signals, being input in a direct succession for selecting the at least one of the components and operating functions of the household appliance, cause a formation of the control command only when the speech signals are separated in time by not more than a respective given first time period, being a respective pause period, and are input within a respective given second time period.

With the objects of the invention in view there is additionally provided, a central computer system for at least one household appliance, the central computer system including a first device for inputting at least two speech signals designating operating functions and/or components of the at least one household appliance; a second device, operatively connected to the first device, for recognizing the operating functions and/or components designated by the speech signals; a third device, operatively connected to the second device, for converting the speech signals, after being recognized, into a control command to operate the household appliance, the third device producing the control command only when the speech signals are input in a sequence defined by a menu tree; and a central computer to be connected to the least one household appliance; and a controller having a control program and being assigned to at least one of the central computer, the first device, the second device, and the third device, the control program operating such that the speech signals, being input in a direct succession for selecting operating functions and/or components of the at least one household appliance, cause a formation of the control command only when the speech signals are separated in time by not more than a respective given first time period and are input within a respective given second time period.

The household appliance according to the invention has, instead of the mechanical operating elements or else in addition to these, a first device for the input of speech signals which designate operating functions of the household appliance, a second device for recognizing the operating functions designated by the speech signals, and a third device for converting the speech signals recognized into control commands to operate the household appliance. It is therefore possible for the household appliance also to be operated by operators who are not directly present at the location of the household appliance. A manual operation does not take place, so that the operator has his "hands free" during the operation of the household appliance. It is therefore possible for the operator, for example to prepare ingredients for preparing a meal and, at the same time to switch on a cook top or hob of a cooker. The formation or generation of undesired control commands is prevented by successive speech signals leading to the formation of a control command only when the successive speech signals are input in a defined sequence and within a predeterminable time. If these conditions are not met, no control command is formed. Furthermore, the speech-signal processing procedures are set back to the starting point of the processing sequence. If therefore the originally intended control command is to be formed, it is not the speech signals which are still missing which have to be input, instead all the specified speech signals have to be input within the defined sequence and within the predeterminable time.

The speech recognition is preferably carried out in a speaker-independent manner and therefore permits the household appliances to be produced in large numbers without having to perform any modifications in order to make them operable for individual operators.

A further advantageous embodiment of the household appliance according to the invention has is characterized in that the control program assigned to a controller is configured in such a way that the first device and/or the second device and/or the third device can be activated only after a mechanical operating element has been actuated. This has the advantage that a radio or television set, which may possibly run all week, cannot switch on the household appliance as a result of the purely random playing of "suitable" keywords.

A further embodiment of the household appliance according to the invention has the advantage that devices which are used for the input of speech signals, for the recognition of the content of speech signals and for the conversion of control signals are used for a number of household appliances. Separate devices specific to the household appliance are therefore not necessary.

Other features which are considered as characteristic for the invention are set forth in the appended claims.

Although the invention is illustrated and described herein as embodied in a household appliance, in particular an electrically operated household appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a block diagram of a configuration having a central computer for controlling a number of household appliances; and FIG. 4 is a schematic block diagram of a household appliance connected to the configuration of FIG. 3.

DESCRIPTION OF THE PREFERRED EMBODIMENTS

Figure 1:
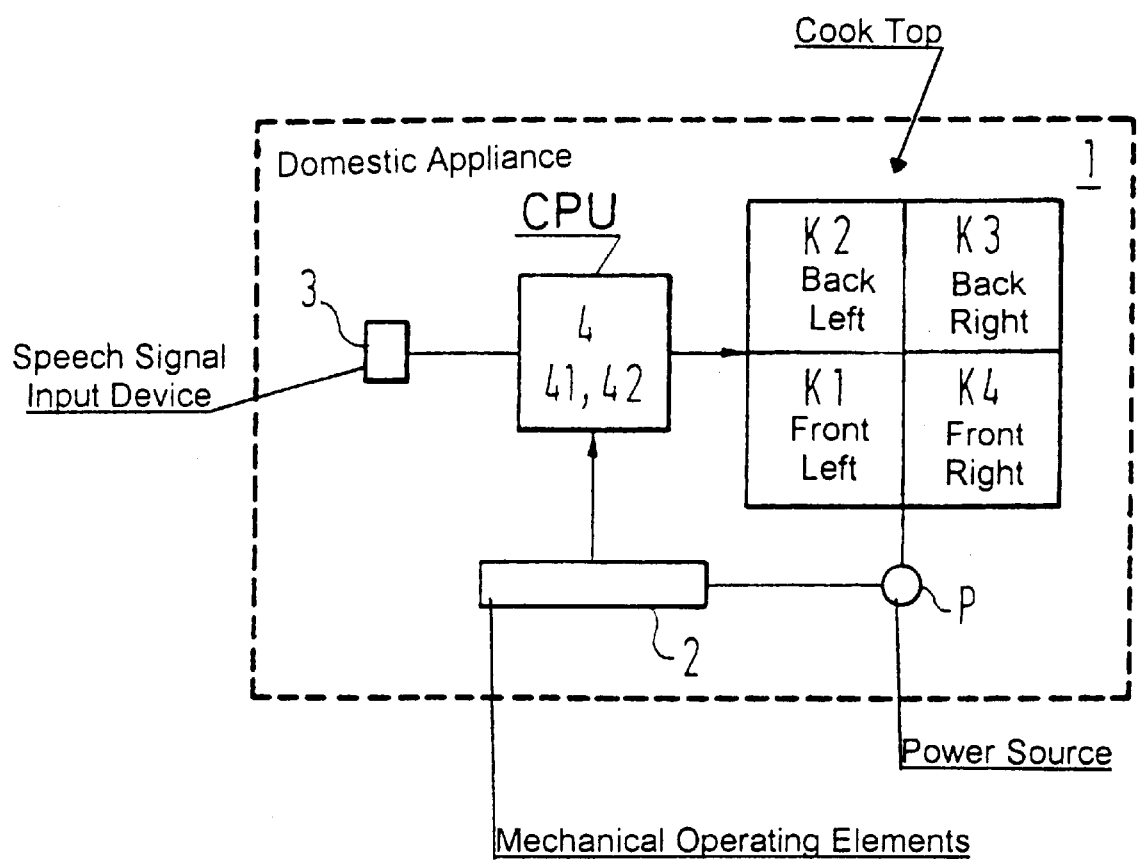
FIG. 1 is a schematic block diagram of a household appliance according to the invention.

Referring now to the figures of the drawings in detail and first, particularly, to FIG. 1 thereof, there is shown an exemplary embodiment of a household appliance 1 according to the invention, which is, for example, an electrically operated cooker with a built-in cook top or hob, and which has mechanical operating elements 2 which switch a power source P. The power source P is used to supply electrical power, for example to a built-in cook top having a first cooking area K1 (front left), a second cooking area K2 (back left), a third cooking area K3 (back right) and a fourth cooking area K4 (front right).

Furthermore, the household appliance according to the invention has a first device 3, which is used for the input of speech signals and, in particular, is formed by a microphone fitted directly to the household appliance.

As an alternative, it is possible to provide the device 3 separated from the household appliance and to provide it, for example, in a portable telephone terminal (cordless telephone; mobile telephone), such that the existing microphone of the telephone terminal has a dual function.

The first device 3 for the input of speech signals is connected to a second device 41, known per se, for recognizing the operating functions designated by the speech signals, and this is in turn connected to a third device 42, known per se, for converting the speech signals recognized into control commands to operate the household appliance 1.

The second device 41 and the third device 42 can be physically connected and, in circuit terms, can be formed by a device 4 or by a controller CPU (microprocessor).

This controller can be formed by the second and third devices 41, 42 or can be assigned to these devices and to the first device 3. The controller is assigned a control program which, inter alia, is configured in such a way that successive speech signals lead to the formation of a control command only when successive speech signals (e.g. W1, W2, W3, W4 in FIG. 2), whose sequence is defined by a menu tree (FIG. 2), are input within a predeterminable time (T12=time between the beginning or the end of the input of one speech signal W1 and the beginning or the end of the input of a following speech signal W2).

Furthermore, the control program can be configured in such a way that if successive speech signals (e.g. W1, W2) are input outside the predeterminable time (T12) or if the speech signal input is aborted (e.g. no input of W3 and W4), a control command is formed only when all the speech signals needed to form a control command are then actually input again in the defined sequence within the respectively predeterminable time (T12 in relation to W1, W2; T23 in relation to W2, W3; T34 in relation to W3, W4 in FIG. 2).

The speech signal recognition is preferably carried out in a speaker-independent manner. However, it can also be carried out in a speaker-dependent manner in particular in a speaker-group-dependent manner. The speech of adults exhibits speech characteristics which distinguish them from the speech characteristics of children. In this embodiment of the household appliance according to the invention, children can be excluded from actuating the household appliance.

The control program can also be configured in such a way that the first and/or the second and/or the third device can be activated only after a mechanical operating element 2 has been actuated. In this case, the mechanical operating element 2 is a special key, switch, or button, whose actuation causes a command to be formed which indicates that a control of the household appliance by speech signals is to be carried out. The actual control, for example of a specific temperature of a cooking area of a cook top, is not carried out with this special key; instead, the control is prepared or set up as a result of the actuation of the special key. In particular, immediately after the household appliance has been switched off, the first and/or the second and/or the third device can be activated only after such a mechanical operating element 2 (special key) has been actuated.

In this case, after the household appliance has been previously switched off, the household appliance can be activated by speech signals only when the mechanical operating element has been actuated beforehand. In this case, provision may be made for this actuation to be enabled only within a predeterminable time period following the switching off.

Furthermore, pauses (Tt in FIG. 2) of different length between the speech signals can be set.

The second device 41 may also recognize the speech signals, which have been input, in a speaker-dependent manner. This makes it possible to authorize only specific persons, for example only the adult members of a household, to actuate the household appliance.

In the present exemplary embodiment, the household appliance has a number of electrical load elements (K1, K2, K3, K4), which can be controlled individually through the use of speech signals.

Figure 2:
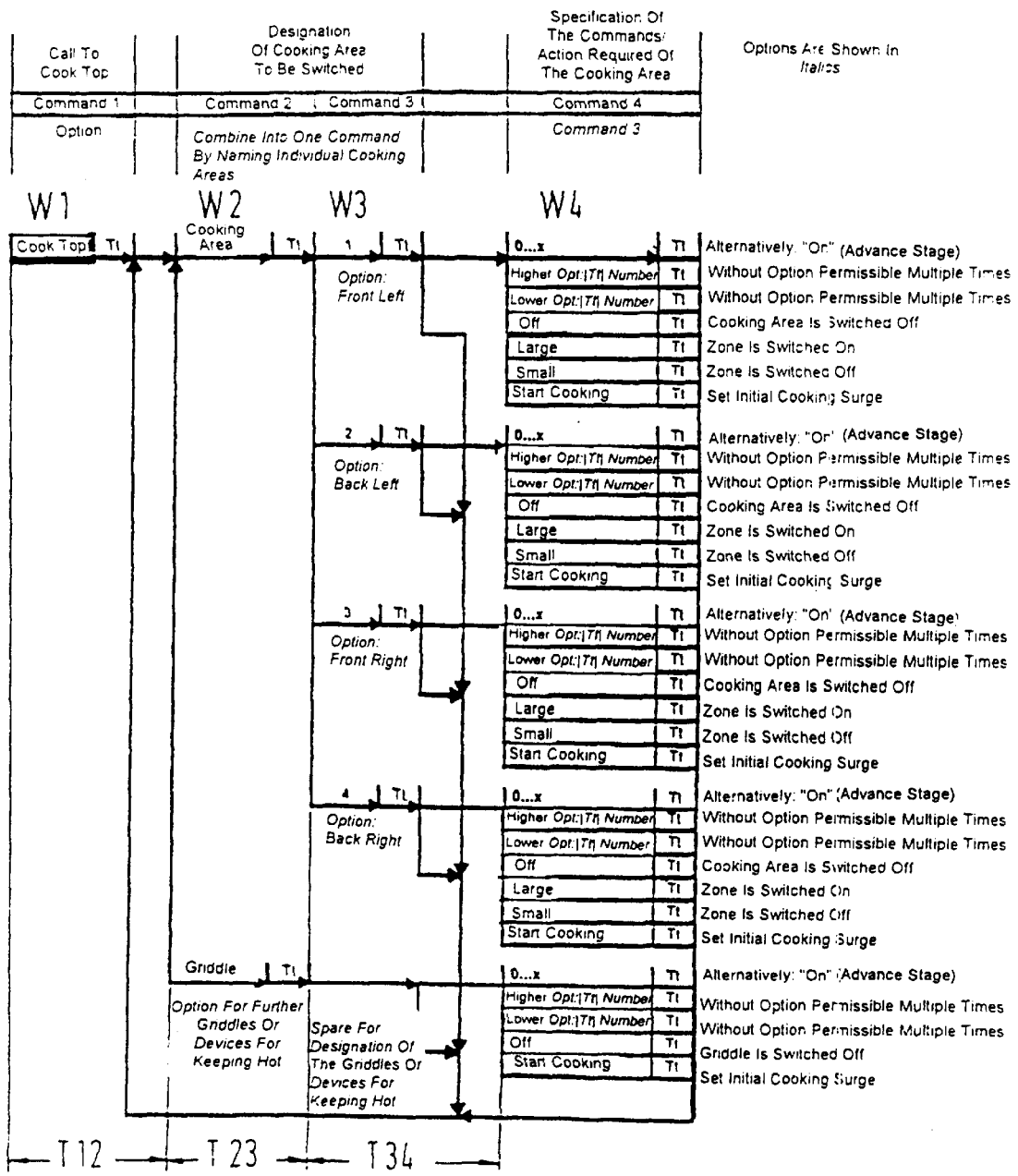
FIG. 2 is a flow chart of an exemplary sequence of steps for controlling a household appliance.

The speech signals preferably include a sequence of predeterminable "keywords" which are to be spoken in particular in a sequence defined by a menu tree. One example of such a menu tree is illustrated in FIG. 2. The structure of this sequence depends on the grammar of the language in which the keywords are spoken.

The words illustrated in FIG. 2, such as "cook top" and "cooking area" can be replaced for the use of the cook top by sequences of sounds of any desired form, so that, for example, even operators with impaired speech can control household appliances according to the invention in a simple way.

In the exemplary embodiment illustrated in FIG. 2, each sequence of keywords begins with the word "cook top" (W1) as an address to the household appliance to be controlled. The function "cooking area" (W2, 1st alternative) or "griddle" (W2, 2nd alternative) is then spoken, the functions "griddle" and "cooking area" being considered intuitively as independent of one another, corresponding to normal domestic use, even if they are used in the same area on the cook top. Following the selection of the function "cooking area" or "griddle", the operator selects, through the use of the keyword "1" or "2" or "3" or "4" (W3, 1st, 2nd, 3rd or 4th alternative), the location on the cook top (front left; back left; back right; front right) on which the cooking area is to carry out actions. As an example of alternative keywords, instead of a number, the designation "front left", "back left", "back right" or "front right" can also be spoken.

After the function "coking area" or "griddle" and the precise designation of the location on the cook top have been specified in this way, the action desired of the relevant cooking area is specified by a further keyword (W4).

Between the speaking of two keywords there is a pause, which is designated by Tt in FIG. 2. The pause is used to separate the keywords clearly from one another, if required, and at the same time to define a time limit after which the following word must be spoken at the latest. If the second word is not spoken or not spoken in time, then this is recognized as an error. Such an incomplete sequence of speech signals or keywords does not lead to the formation of a control command and therefore does not lead to any action on the cook top; a so-called time-out occurs. This is also true if the sequence of keywords continues to be spoken correctly after a time limit has been exceeded.

In the case of such an error, the appropriate sequence of keywords W1, W2, W3, W4 for the control of the household appliance (here: cook top) must be spoken again from the beginning.

An erroneous operation of the cook top, which might possibly be caused, for example, by a sequence of words of an accidental conversation or of a radio or television transmission in the background, is not to be expected in the case of the sequence of method steps provided in accordance with the invention, since the probability that precisely the prescribed keywords are said in precisely the provided sequence in precisely the prescribed time relation is extremely low.

The operational safety of the cook top can be ensured by further special measures. In order to prevent that a switched-off cook top, for example, cannot be switched on, for example by a radio playing for several weeks, which accidentally specifies a suitable combination of keywords, according to one exemplary embodiment of the present invention, a switched-off cook top is prepared or initialized for the input of speech signals by a manual actuation of a mechanical operating element 2. If this input of speech signals does not take place within a specific time, then the operating logic formed by the above-mentioned devices of the household appliance returns into its quiescent state or sleep mode again and cannot be put into operation by an accidental combination of keywords.

If, immediately following the speaking of a sequence of keywords, actions are to be initiated in a further cooking area on the cook top, then it is not necessary to speak the keyword "cook top" if the time of a time-out Tt defined for this has not yet elapsed. It is immediately possible for a new cooking area to be selected by the appropriate keyword. The procedure is similar when a number of actions are to be carried out on one cooking area. One example of this is the sequence of keywords "cook top—cooking area—front left—on—zone—start cooking"; it switches on the front left cooking area with the additional zone and sets the initial cooking surge. If at least one heating element of the cook top is in operation, then the actuation of the mechanical operating element (safety switch) is not necessary before each further spoken control of the cook top, since it can be assumed that a person authorized to operate the cook top is in the room and, as previously, is monitoring the safe function of the cook top.

The circuit configuration illustrated in FIG. 3 includes a central computer CC and a number of household appliances A1, ..., An. Each household appliance Ax (x=1, ... n) can have a local control system ALCx. The household appliances are connected to the central computer CC via an installation bus IB. The local control systems of the household appliances can control the household appliances in each case through the use of a control program which, for example, is stored in the respective household appliance. The local household appliance control systems can also be controlled on the basis of a control program which is assigned to the central computer CC.

The central computer CC is assigned a first device 3 for the input of speech signals, which designate operating functions of at least one household appliance, as well as a second device 41 for recognizing the operating functions (speech signal contents) designated by the speech signals, as well as a third device 42, which converts recognized speech signal contents into control commands to operate at least one household appliance.

The exemplary embodiment of a household appliance A1 according to the invention as illustrated schematically in FIG. 4, which, for example, is an electrically operated cook top, has mechanical operating elements 2 which switch a power source P. Instead of one or more mechanical operating elements 2, other operating elements, such as contact switches, can also be provided.

The power source P is used to supply electrical power, for example to a cook top having a first cooking area K1 (front left), a second cooking area K2 (back left), a third cooking area K3 (back right), and a fourth cooking area K4 (front right).

The first device 3 for the input of speech signals (FIG. 3) can be integrated into a household appliance, as is illustrated in FIG. 4 for the household appliance 1. The first device 3 is formed in particular by at least one microphone fitted directly to the household appliance, the microphone or the microphones is or are preferably aligned with the probable whereabouts of the sound source (head of the speaker). A number of microphones make it possible to monitor various zones with maximum sensitivity. The microphone or microphones can also be disposed at other locations, for example in addition to the location (for example kitchen) of the household appliance, also at another location (for example living room).

The first device 3 is connected to the local control system ALC1, which is further connected to the central computer CC (FIG. 3) and the cook top (K1, K2, K3, K4). Furthermore, the local control system ALC1 can be connected to the operating elements 2, in order to perform control procedures on the basis of actuations of the operating elements 2.

The microphone or microphones have directional characteristics. The lobe of maximum sensitivity is located at the probable height of the head of the operator. Through the use of microphone diaphragms, which are fitted to the microphone such that they can be moved and/or replaced, the directional characteristics of the microphone can be matched to the conditions in the respective room. The microphone or the microphones are installed on a holding element which does not transmit structure-borne sound. A number of microphones make it possible to monitor different zones with maximum sensitivity.

The first device 3 can also have an electric filter, which attenuates oscillations with frequencies below about 100 hertz and/or oscillations above about 5 kilohertz. The filter is in particular a bandpass filter, which attenuates oscillations with frequencies below about 100 hertz and oscillations above about 4 or 5 kilohertz.

Furthermore, the first device 3 can be assigned a device which measures acoustic interference, in particular electrical signals which represent the acoustic interference. The first device 3 can also be assigned a device which compares the measured acoustic interference, in particular electrical signals which represent the acoustic interference, with electric useful acoustic signals (desired signals). This permits interference to be eliminated automatically.

The first device 3 can be disposed to be physically separate from the second device 41 for recognizing the operating functions designated by the speech signals, the first device 3 being connected to the second device 41, for example by a shielded cable. The devices 3 and 41 can be connectable to each other without wires, for example via an infrared connection. The microphone is installed on a holding element which damps structure-borne sound or oscillations.

The device 3, which can be disposed separated from the central computer CC (FIG. 1) or from a household appliance, is embodied, for example, as a portable telephone terminal (cordless telephone; mobile telephone).

By contrast, the second device 41 for recognizing the operating functions designated by the speech signals, and the third device 42 for converting the speech signals recognized into control commands to operate a household appliance (e.g. A1) are preferably disposed in or in the vicinity of the central computer CC.

The control program assigned to the central computer CC is configured, in a manner corresponding to the control program already described with reference to FIG. 2, in such a way that successive speech signals lead to the formation of a control command only when successive speech signals W1, W2, W3, W4 (cf. FIG. 2) are input within a predetermined time T12, T23, T34 (FIG. 2).

If successive speech signals are input outside the predeterminable time, or if the input of the speech signals is aborted, a control command is formed only when all the speech signals needed to form a control command are input again in the defined sequence and successive speech signals are input again within the predeterminable time periods (T12, T23, T34).

After having been switched off, a household appliance can be activated by speech signals only after the (mechanical) operating element is actuated. In this case, provision may be made for this actuation to be enabled only within a predeterminable time period.

Furthermore, the control may be configured such that the control of the household appliance or the formation of a control command can be activated by speech signals only after inputting a given number, for example "three".

Likewise, pauses of different length between the speech signals can be predetermined.

The speech signal recognition is preferably carried out in a speaker-independent manner, but the speech signal recognition can also be carried out in a speaker-dependent manner through the use of the second device 41, so that it becomes possible to authorize only specific persons, for example only the adult members of a household, to actuate the household appliance.

In the exemplary embodiment illustrated in FIG. 4, the household appliance 1 has a number of electric load elements K1, K2, K3, K4, which can be controlled individually or in specific combinations (K2 and K3) by speech signals.

The speech signals preferably include a sequence of predeterminable "keywords", which have to be spoken in particular in a defined sequence. The structure of this sequence depends on the grammar of the language in which the keywords are spoken. The words such as "cook top", "cooking area" can be replaced during the use of the cook top by sequences of sounds of any desired configuration, so that, for example, even operators with impaired speech can control the household appliances in a simple way.

Each sequence of keywords starts with the word "cook top" as an address to the household appliance itself. Then, the function "cooking area" or "griddle" has to be named, the function "griddle" and "cooking area" being considered intuitively as independent of each other, corresponding to normal domestic use, even if they are used in the same area on the cook top.

Following the selection of the function "cooking area" or "griddle", the operating person selects, through the use of the keyword "1" or "2" or "3" or "4", the location on the cook top (front left; back left; back right; front right) on which the cooking area is to carry out actions. As an example of alternative keywords, instead of a number, the designation "front left", "back left", "back right" or "front right" can also be spoken.

After the function "cooking area" or "griddle" and the precise designation of the location on the cook top have been specified in this way, the action desired of the relevant cooking area is specified by a further keyword, for example "higher" for electrical power to be supplied or increased in steps, for example.

Between the speaking of two keywords there is a pause, which is designated in FIG. 2 by Tt. The pause is used to separate the keywords clearly from one another if required and, at the same time, to define a time limit after which the following word must be spoken at the latest. If the second word is not spoken or is not spoken in good time, then this is recognized as an error. Such an incomplete sequence of speech signals or keywords does not lead to the formation of a control command, and therefore does not lead to any action on the cook top; a so-called time-out occurs. This is also true when the sequence of keywords continues to be spoken correctly after a time limit has been exceeded. The pauses can have different lengths.

For any action on the cook top, the appropriate sequence of keywords must be spoken again from the beginning.

An erroneous operation of the cook top, as could be expected, for example, from a sequence of words of a random conversation or from a radio or television transmission in the background, is extremely unlikely in the case of the sequence of method steps provided according to the invention, since the probability that precisely the prescribed keywords occur in precisely the prescribed sequence in precisely the prescribed time relation is extremely low.

As already described for a single household appliance with reference to FIG. 2, the operational safety of the cook top can be ensured by further special measures. In order that, for example, a switched-off cook top or any other household appliance connected to the central computer CC cannot be switched on, for example by a radio playing for several weeks, which specifies a randomly suitable combination of keywords, as already described, according to one exemplary embodiment of the present invention a completely switched-off household appliance is prepared or initialized for the input of speech signals before being switched on, through the use of the manual actuation of a mechanical operating element. If this operation does not take place within a specific time period, then the operating logic formed by the above-mentioned devices of the household appliance change back again into their quiescent state and cannot be put into operation by a random combination of keywords.

If, immediately after speaking a sequence of keywords, actions are to be initiated in a further cooking area on the cook top, then saying the keyword "cook top" is not necessary if the time of a time-out Tt defined for this has not yet elapsed. It is then immediately possible for a new cooking area to be selected by the appropriate keyword.

The procedure is similar when a number of actions are to be carried out on one cooking area. One example of this is the sequence of keywords "cook top—cooking area—front left—on—zone—start cooking". It switches on the front left cooking area with the additional zone and sets the initial cooking surge. If at least one heating element of the cook top is in operation, an actuation of the mechanical operating element (safety switch) is then not necessary before each further speech operation of the cook top, because it can be assumed that a person authorized to operate the cook top is in the room and, as before, is monitoring the safe function of the cook top.

We claim:

1. A household appliance configuration, comprising:
a kitchen appliance having operating functions;
a first device, connected to said kitchen appliance, for inputting at least two speech signals designating the operating functions of said kitchen appliance;
a second device, operatively connected to said first device, for recognizing the operating functions designated by the speech signals; and
a third device, operatively connected to said second device, for converting the speech signals, after being recognized, into a given control command to operate said kitchen appliance, said third device producing the given control command only when the speech signals are input in a sequence defined by a menu tree; and
a controller having a control program and being assigned to at least one of said first, second, and third devices, said control program operating such that the speech signals, being input in a direct succession for selecting the operating functions, cause a formation of the given control command only when the speech signals are separated in time by not more than a respective given first time period, being a respective pause period, and are input within a respective given second time period.

2. The household appliance configuration according to claim 1, wherein said controller is configured such that if the speech signals are input outside the respective given second time period, the given control command is formed only when all of the speech signals needed to form the given control command are input again in a defined sequence and within the respective given second time period.

3. The household appliance configuration according to claim 1, wherein said controller is configured such that if an input of the speech signals is aborted, the given control command is formed only when all of the speech signals needed to form the given control command are input again in a defined sequence and within the respective given second time period.

4. The household appliance configuration according to claim 1, wherein said controller is configured for carrying out a speaker-independent speech signal recognition.

5. The household appliance configuration according claim 1, including a mechanical operating element connected to said controller, said controller being configured such that at least one of said first, second, and third devices can be activated only after said mechanical operating element has been actuated.

6. The household appliance configuration according to claim 5, wherein said controller is configured such that, immediately after said kitchen appliance has been switched off, at least one of said first, second, and third devices can be activated only after said mechanical operating element has been actuated.

7. The household appliance configuration according to claim 5, wherein said first, second, and third devices can be activated in a given third time period after said mechanical operating element has been actuated.

8. The household appliance configuration according claim 1, wherein said first device is disposed on said kitchen appliance.

9. The household appliance configuration according claim 1, wherein said first device is disposed separated from said kitchen appliance.

10. The household appliance configuration according to claim 1, wherein said first device is configured to be integrated into a portable telephone terminal.

11. The household appliance configuration according to claim 1, including electrical load elements, said electrical load elements being controllable individually by the speech signals.

12. The household appliance configuration according to claim 1, including a shielded cable for connecting said first device to said second device, said first device being disposed physically separated from said second device.

13. The household appliance configuration according to claim 1, wherein said first device includes at least one microphone, said at least one microphone being disposed approximately at a level of a head of an operator.

14. The household appliance configuration according to claim 1, including a holding element, said first device having least one microphone installed on said holding element, said holding element damping structure-borne sound.

15. The household appliance configuration according to claim 1, wherein said first device includes an electric filter damping oscillations of frequencies below approximately 100 hertz.

16. The household appliance configuration according to claim 1, wherein said first device includes an electric filter damping oscillations of frequencies above approximately 5 kilohertz.

17. The household appliance configuration according to claim 1, including a measuring device for measuring an acoustic interference, said measuring device being assigned to said first device.

18. The household appliance configuration according to claim 1, including a measuring device for measuring electrical signals representing an acoustic interference, said measuring device being assigned to said first device.

19. The household appliance configuration according to claim 18, including a comparison device for comparing the acoustic interference with electrical useful acoustic signals, said comparison device being assigned to said first device.

20. The household appliance configuration according to claim 18, including a comparison device for comparing electrical signals representing the acoustic interference, with electrical useful acoustic signals, said comparison device being assigned to said first device.

21. The household appliance configuration according to claim 1, including a portable telephone terminal, said first device being integrated into said portable telephone terminal.

22. The household appliance configuration according to claim 1, wherein said kitchen appliance includes at least one electrically operated component, said first device designates the operating functions and said at least one electrically operated component, said second device recognizes the operating functions and said at least one electrically operated component designated by the speech signals.

23. The household appliance configuration according to claim 1, wherein said kitchen appliance includes mechanical operating elements for inputting control commands when being actuated.

24. The household appliance configuration according to claim 1, wherein said first, second, and third devices are a provided in place of mechanical operating elements for inputting control commands when actuated.

25. A household appliance system, comprising:
   a kitchen appliance having operating functions;
   a first device for inputting at least two speech signals designating the operating functions of said kitchen appliance;
   a second device, operatively connected to said first device, for recognizing the operating functions designated by the speech signals;
   a third device, operatively connected to said second device, for converting the speech signals, after being recognized, into a given control command to operate said kitchen appliance, said third device producing the given control command only when the speech signals are input in a sequence defined by a menu tree; and
   a central computer connected to said kitchen appliance, at least one of said first, second, and third devices being assigned to said central computer, said first, second, and third devices being configured such that the speech signals, being input in a direct succession for selecting the operating functions of said kitchen appliance, cause a formation of the given control command only when the speech signals are separated in time by not more than a respective given first time period and are input within a respective given second time period, said central computer being connectable to further kitchen appliances.

26. The household appliance system according to claim 25, wherein said central computer is assigned a control program.

27. The household appliance system according to claim 25, wherein said kitchen appliance includes components, said first device designating the operating functions and said components, said second device recognizing the operating functions and said components designated by the speech signals.

28. In combination with a kitchen appliance having components and operating functions, a speech-activated device comprising:
   a first device for inputting at least two speech signals designating at least one of the components and operating functions of the kitchen appliance;
   a second device, operatively connected to said first device, for recognizing the at least one of the components and operating functions designated by the speech signals; and
   a third device, operatively connected to said second device, for converting the speech signals, after being recognized, into a control command to operate the kitchen appliance, said third device producing the control command only when the speech signals are input in a sequence defined by a menu tree; and
   a controller having a control program and being assigned to at least one of said first, second, and third devices, said control program operating such that the speech signals, being input in a direct succession for selecting the at least one of the components and operating functions of the kitchen appliance, cause a formation of the control command only when the speech signals are separated in time by not more than a respective given first time period, being a respective pause period, and are input within a respective given second time period.

29. A central computer system for at least one kitchen appliance, comprising:
   a first device for inputting at least two speech signals designating operating functions of the at least one kitchen appliance;
   a second device, operatively connected to said first device, for recognizing the operating functions designated by the speech signals;
   a third device, operatively connected to said second device, for converting the speech signals, after being recognized, into a control command to operate the kitchen appliance, said third device producing the control command only when the speech signals are input in a sequence defined by a menu tree; and
   a central computer to be connected to the least one kitchen appliance; and
   a controller having a control program and being assigned to at least one of said central computer, said first device, said second device, and said third device, said control program operating such that the speech signals, being input in a direct succession for selecting operating functions of the at least one kitchen appliance, cause a formation of the control command only when the speech signals are separated in time by not more than a respective given first time period and are input within a respective given second time period.

* * * * *